Patented Aug. 29, 1950

2,520,551

UNITED STATES PATENT OFFICE 2,520,551

N-SUBSTITUTED OXYACETAMIDES

Lowell B. Kilgore, Washington, D. C., assignor, by mesne assignments, to Lowell B. Kilgore and Helen Ford Kilgore, both of Washington, D. C.

No Drawing. Application April 27, 1945, Serial No. 590,722

9 Claims. (Cl. 167—30)

The invention described herein relates to new organic compounds, more particularly to a new class of N-substituted acetamides and specifically to N-substituted α-etherified acetamides and methods for their preparation. This application is a continuation-in-part of my co-pending application Serial No. 461,481, filed October 9, 1942 which has matured into Patent No. 2,426,885, dated Sept. 2, 1947.

An object of the present invention is to provide new and useful compounds of the general formula:

R—O—CH₂—CO—NHR′ wherein R is a radical of the type R″—(O—A)$_n$— in which R″ is selected from the group consisting of hydrocarbon and halogenated aryl, A is alkylene, and $n$ is an integer not greater than 2; and R′ is hydrocarbon. A further object of this invention is the preparation of new and useful chemicals which possess insect combating properties to a high degree. Other objects and advantages of the invention will hereinafter appear.

These objects may be accomplished by reacting an α-etherified acetic acid with a primary amine so as to eliminate a molecule of water as follows:

(1) R—O—CH₂COOH+R′—NH₂→
R—O—CH₂—CO—NHR′+HOH

The same objects may also be accomplished by reacting an amide-forming derivative of an α-etherified acetic acid, such as the acyl halide, acid anhydride, or the ester of a volatile alcohol with a primary amine. These methods of preparing my new N-substituted α-etherified acetamides are characterized by the following equations:

(2) R—O—CH₂COOY+R′NH₂→
R—O—CH₂CO—NHR′+YOH (3) R—O—CH₂COX+R′NH₂→
R—O—CH₂CO—NHR′+HX wherein Y is the hydrocarbon residue of a volatile alcohol and X is halogen.

Still another means which I have discovered of attaining the objects of this invention comprises reacting the proper N-substituted α-haloacetamide with the alkali oxide of the requisite alcohol as shown by the following equation:

(4) R—O—Me+XCH₂CO—NHR′→
R—O—CH₂—NHR′+MeX wherein Me represents an alkali metal and X is halogen. In the foregoing equations (1), (2), (3) and (4), R and R′ represent either the same or different organic radicals.

The various means of obtaining the objects of this invention will be more readily understood by the following showing of detailed examples which, however, do not limit the scope of the invention in any way.

EXAMPLE 1

*Preparation of N-cyclohexyl β-phenoxyethoxyacetamide*

A mixture of 21 grams of methyl β-phenoxyethoxyacetate and 15 grams of cyclohexyl amine was refluxed for a day on an oil bath. During this refluxing the methanol of reaction was gradually distilled off. The reaction mixture was diluted with a benzene-ether solution and fractionated under reduced pressure. 14 grams of N-cyclohexyl β-phenoxyethoxyacetamide boiling at 188–190° C./2 mm. were obtained.

EXAMPLE 2

*Preparation of N-cyclohexyl β-butoxyethoxyacetamide*

A mixture of 17.6 grams of β-butoxyethoxyacetic acid, 12 grams of thionyl chloride and 75 cc. of benzene was refluxed for three hours. Then excess thionyl chloride was removed by distillation together with 25 cc. of benzene. 9.8 grams of cyclohexyl amine were added and the resulting mixture refluxed for 5 hours. The reaction mixture was washed with water and NaHCO₃ solution and then distilled under reduced pressure. 21 grams of N-cyclohexyl β-butoxyethoxyacetamide boiling at 136–138° C./1 mm. were obtained.

EXAMPLE 3

*Preparation of N-allyl β-butoxyethoxyethoxyacetamide*

6 grams of β-butoxyethoxyethoxyacetic acid and an excess of allyl amine were refluxed under an air condenser at 160° for 4 hours then at 200° for ½ hour so that water could escape as formed. The reaction mixture was diluted with benzene and successively washed with water, dilute HCl, water, NaHCO₃ solution and water. It was then distilled under reduced pressure. 3 grams of N-allyl β-butoxyethoxyethoxyacetamide boiling at 130–135° C./1 mm. were obtained.

Other members of the new series of N-substituted α-etherified acetamides which I have prepared by the methods set out in detail in the aforedescribed examples are:

N-amyl butoxyethoxyacetamide
N-amyl 2,4,5,6-tetrachlorophenoxymethoxyacetamide
N-octyl 2,4,5,6-tetrachlorophenoxymethoxyacetamide
N-amyl benzoxymethoxyacetamide
N-cyclohexyl β-ethoxyethoxyacetamide
N-amyl β-butoxyethoxyacetamide
N-dodecyl β-butoxyethoxyacetamide
N-phenethyl benzoxyethoxyacetamide
N-amyl β-butoxyethoxyethoxyacetamide
N-phenyl β-butoxyethoxyethoxyacetamide I have discovered that the new N-substituted α-etherified acetamides of my invention, as a class, possess valuable insect toxicant and fugient properties. Furthermore the physical properties of these compounds such as odor and color are such as to make them unobjectionable for human use.

Table I demonstrates the efficacy of representative members of this new series of organic compounds against the common house fly, *Musca domestica*. The test procedure used was the "Sandwich Bait" method substantially as described in Soap, June 1939, p. 103 ff. A coating of molasses was applied to one side of a strip of blotting paper and dried to a hard glossy surface. The molasses was then covered with a strip of a special thin, porous paper which had previously been immersed in an alcohol solution of the compound to be tested and then dried until the alcohol had evaporated. For purpose of comparison one strip was treated only with solvent and dried. The strips prepared in this fashion were mounted on a board and introduced into a large cage containing more than 2000 hungry house flies. By making observations at frequent intervals the duration of repellency, that is the length of time which elapsed before the flies began to feed on the molasses through the treated tissue was determined.

Table I

| Compound | Concentration, Percent by Weight | Duration of Repellency |
| --- | --- | --- |
| N-Cyclohexyl β-ethoxyethoxyacetamide. | 5 | 2 hr. |
| N-Amyl β-butoxyethoxyacetamide. | 30 | 3 hr. 25 min.[1] |
| N-Cyclohexyl β-butoxyethoxyacetamide. | 5 | 6 hr.[1] |
| N-Amyl β-butoxyethoxyacetamide. | 30 | 3 hr.[1] |

[1] Bait still untouched. Test discontinued in order to feed flies.

Not only do the compounds of my invention possess especially marked repellency to house flies, they are also very effective against other annoying pests such as the blackfly, mosquito, flea, red bug, gnat, and moth.

EXAMPLE 4

(a) When applied to the forearm of an individual exposed to hungry *Aedes aegypti* mosquitoes, N-cyclohexyl β-butoxyethoxyacetamide repelled the insects for an average of 252 minutes.

(b) When applied to the forearm of an individual exposed to hungry *Aedes aegypti* mosquitoes, N-cyclohexyl β-ethoxyethoxyacetamide repelled the insects for an average of 73 minutes.

Moreover I have discovered that these new N-substituted α-etherified acetamides possess contact insecticidal properties. This was demonstrated by means of the Peet-Grady bio-assay technique using house flies.

EXAMPLE 5

(a) 5 percent solution of N-amyl 2,4,5,6-tetrachlorophenoxymethoxyacetamide in deodorized kerosene gave a knockdown of 97 percent in ten minutes and a 51 percent kill after 24 hours when tested by the Peet-Grady method against house flies.

(b) A 5 percent solution of N-cyclohexyl β-ethoxyethoxyacetamide in deodorized kerosene gave a knockdown of 97 percent in ten minutes and a kill of 36 percent after 24 hours when tested by the Peet-Grady method against house flies.

These new N-substituted α-etherified acetamides may be employed by direct topical application or they may be incorporated into liquid or solid carriers. They are especially useful as the active ingredients of insect-repellent lotions, creams, ointments and the like. They may be dissolved in liquid diluents such as alcohol, aqueous alcohol, isopropanol, dimethyl phthalate and hydrocarbon oils such as kerosene or emulsified in water, if necessary with the aid of a suitable dispersing agent. If desired they may be admixed with finely divided carriers such as diatomaceous earth, talc, pyrophylite, bentonite, etc.

Furthermore the new compounds of my invention may be combined with insecticidal materials such as pyrethrum, rotenone, derris, cube, DDT and the like. Such a combination is particularly effective where the paralytic and lethal action of the insecticide is slow.

Although this invention has been described with reference to illustrative embodiments thereof it will be apparent to those skilled in the art that the principles of this invention may be embodied in other forms but within the scope of the appended claims.

What I claim is:

1. The N-substituted α-etherified acetamides having the general formula:

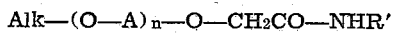

Alk—(O—A)$_n$—O—CH$_2$CO—NHR' wherein Alk is alkyl, A is alkylene and $n$ is a positive integer not greater than 2; and R' is hydrocarbon.

2. N-amyl β-butoxyethoxyacetamide
3. N-cyclohexyl β-butoxyethoxyacetamide
4. N-amyl β-butoxyethoxyethoxyacetamide
5. An insect combative composition of matter comprising as essential active ingredient N-amyl β-butoxyethoxyacetamide and a carrier therefor.
6. An insect combative composition of matter comprising as essential active ingredient N-cyclohexyl β-butoxyethoxyacetamide and a carrier therefor.
7. An insect combative composition of matter comprising as essential active ingredient N-amyl β-butoxyethoxyethoxyacetamide and a carrier therefor.
8. The N-substituted alpha-etherified acetamides having the general formula:

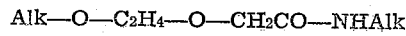

Alk—O—C$_2$H$_4$—O—CH$_2$CO—NHAlk wherein Alk is alkyl.

9. The N-substituted alpha-etherified acetamides having the general formula:

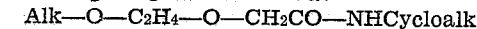

Alk—O—C$_2$H$_4$—O—CH$_2$CO—NHCycloalk wherein Alk is alkyl and Cycloalk is cycloalkyl.

LOWELL B. KILGORE.

(References on following page)

REFERENCES CITED

The following references are of record in the file of this patent:

UNITED STATES PATENTS

| Number | Name | Date |
|---|---|---|
| Re. 22,700 | Muller | Sept. 20, 1945 |
| 563,009 | Bischler | June 30, 1896 |
| 2,347,494 | Meigs | Apr. 25, 1944 |
| 2,382,433 | McNally et al. | Aug. 14, 1945 |
| 2,426,885 | Kilgore | Sept. 2, 1947 |

FOREIGN PATENTS

| Number | Country | Date |
|---|---|---|
| 585,740 | Germany | Oct. 17, 1933 |
| 784,666 | France | May 6, 1935 |
| 501,004 | Great Britain | Feb. 10, 1939 |

OTHER REFERENCES

Sidgwicks Organic Chemistry of Nitrogen (1937), pages 136 to 140.

Walther in "Jour. Prak. Chem." (2), vol. 65, page 480, 1902.